(12) United States Patent
Fan et al.

(10) Patent No.: US 12,141,041 B2
(45) Date of Patent: Nov. 12, 2024

(54) EFFICIENCY AND RELIABILITY IMPROVEMENT IN COMPUTING SERVICE

(71) Applicant: MemVerge, Inc., Milpitas, CA (US)

(72) Inventors: Chenggong Fan, Saratoga, CA (US); Yue Li, Fremont, CA (US); Yong Tian, Cupertino, CA (US); Jingchao Sun, San Jose, CA (US); Ashley Tung, Palo Alto, CA (US); Haiyan Wang, Fremont, CA (US)

(73) Assignee: MEMVERGE, INC., Milpitas, CA (US)

( * ) Notice: Subject to any disclaimer, the term of this patent is extended or adjusted under 35 U.S.C. 154(b) by 95 days.

(21) Appl. No.: 17/937,760

(22) Filed: Oct. 3, 2022

(65) Prior Publication Data

US 2023/0108757 A1    Apr. 6, 2023

Related U.S. Application Data

(60) Provisional application No. 63/252,360, filed on Oct. 5, 2021.

(51) Int. Cl.
*G06F 11/00* (2006.01)
*G06F 11/14* (2006.01)
*G06F 11/20* (2006.01)

(52) U.S. Cl.
CPC ........ *G06F 11/203* (2013.01); *G06F 11/1402* (2013.01); *G06F 11/1407* (2013.01); *G06F 11/1438* (2013.01); *G06F 11/2025* (2013.01); *G06F 2201/84* (2013.01)

(58) Field of Classification Search
CPC ............ G06F 11/1402; G06F 11/1407; G06F 11/1438; G06F 11/2025; G06F 11/203
See application file for complete search history.

(56) References Cited

U.S. PATENT DOCUMENTS

| | | | |
|---|---|---|---|
| 7,529,897 B1 * | 5/2009 | Waldspurger | G06F 11/1482 714/13 |
| 9,652,326 B1 * | 5/2017 | Bauer | G06F 11/2035 |
| 10,120,764 B1 * | 11/2018 | Ramachandran | G06F 11/203 |
| 10,152,386 B1 * | 12/2018 | Ramachandran | G06F 11/1464 |
| 10,503,612 B1 * | 12/2019 | Wang | G06F 11/2023 |

(Continued)

*Primary Examiner* — Joshua P Lottich
(74) *Attorney, Agent, or Firm* — Perkins Coie LLP (57) ABSTRACT

To address loss of access to computing instances in a cloud computing environment, techniques are introduced for moving an application between computing instances in the cloud computing environment. A computing service captures baseline or delta snapshots of the state of the application running on a first computing instance. A baseline snapshot is indicative of the full state of the application, and a delta snapshot is indicative of changes in the state since a most recent snapshot was captured. Responsive to receiving an indication that the first computing instance is to stop servicing the application, the computing service stops the application from running on the first computing instance and moves data from the captured snapshots to a second computing instance. The computing service resume execution of the application on the second computing instances and captures snapshots of the state of the application at the second computing instance.

18 Claims, 5 Drawing Sheets

(56) References Cited

U.S. PATENT DOCUMENTS

| | | | |
|---|---|---|---|
| 2010/0082922 A1* | 4/2010 | George | G06F 9/461 |
| | | | 711/E12.103 |
| 2012/0233611 A1* | 9/2012 | Voccio | G06F 3/067 |
| | | | 718/1 |
| 2014/0130040 A1* | 5/2014 | Lemanski | G06F 9/4881 |
| | | | 718/1 |
| 2015/0154081 A1* | 6/2015 | Javadekar | G06F 11/1484 |
| | | | 707/639 |
| 2016/0048408 A1* | 2/2016 | Madhu | H04L 47/783 |
| | | | 718/1 |
| 2018/0157561 A1* | 6/2018 | Venkatesh | G06F 11/1451 |
| 2019/0012238 A1* | 1/2019 | Butterworth | G06F 11/2048 |
| 2020/0110675 A1* | 4/2020 | Wang | G06F 11/2028 |

* cited by examiner

EFFICIENCY AND RELIABILITY IMPROVEMENT IN COMPUTING SERVICE

CROSS-REFERENCE TO RELATED APPLICATION(S)

This application claims the benefit of U.S. Provisional Application No. 63/252,360, titled "EFFICIENCY AND RELIABILITY IMPROVEMENT IN CLOUD SERVICE SERVER," filed on Oct. 5, 2021, the content of which is hereby incorporated by reference in its entirety.

TECHNICAL FIELD

The present disclosure relates generally to memory management in a computer system, and more particularly, to improvement in efficiency and reliability in managing and relocating application in a cloud environment.

BACKGROUND

A current computer industry practice is for computer companies to offer excess computing instances for use by other systems. A computer company may hold an auction with its excess computing instances, which another system selects from based on price and processing ability of the computing instances. Once the system has selected a computing instance for use, the system may run its own process (es), such as an application, on the selected computing instance. However, the computer company may terminate the system's access to the selected computing instance at any time as demand for and prices of the excess computing instances fluctuate. The computer company may not notify the system of the termination with enough lead time for the third party system to extract a state of the process running at the selected computing instance. Thus, methods for saving states of processes running on such computing instances are needed.

Further, in an auction, the cost of a computing instance is typically based on an amount of memory the computing instance supports. For example, a computing instance that can support more memory is often more expensive at auction than a computing instance that only offers less memory support. In applications, some phases of processing require more memory than other phases. Since cost of a computing instance at auction depends on the amount of memory it supports, a system may need to spend more to obtain access to certain computing instances to run its processing based on one phase requiring more memory than the other phases. Thus, improvements in methods for reducing need to purchase computing instances based on a small subset of phases are desirable.

DETAILED DESCRIPTION

Overview

Computer systems typically provide mechanisms to allocate computing instances to user-space applications. For example, an application may request use of computing instances offered by a separate computing system. The request may be based on an auction of computing instances by the separate computing system, which can allocate a computing instance to the application in response to the request. The application may use the allocated computing instance until the separate computing system reclaims the computing instance for its own use or until the computing instance is unsuitable for the application's processing needs.

One challenge of auctioning off computing instances for use by applications is that often, third party systems that govern the computing instances may abruptly reclaim a computing instance for its own use (e.g., for running its own application or for running a higher bidder's application). When this happens, the application may not have enough time to save the state of a process (or processes) that the application is running on the computing instance, thereby resulting in loss of the data.

Another common challenge faced by applications is the need for more memory than available for completing one or more processes. Phases of a process may require different amounts of memory, which an application may take into account when bidding at auction for computing instances to run its processes on. However, if a process only requires high memory for a small phase, the application may overspend on a computing instance that can accommodate that single phase when the rest of the phases could be run on a computing instance with much less memory available.

Introduced herein is a technique for moving data from snapshots between computing instances to address the above-mentioned challenges. In some embodiments, a computer system can be configured to move data for an application between computing instances using a variety of snapshots. For instance, the computer system receives a request from an application for access to a computing instance for running a process. The computer system allocates a first computing instance to the application based on a set of parameters related to the request (e.g., processing capabilities needed for the process, memory available, etc.) and the application uses the first computing instance for the process. As the process is running at the first computing instance, the computer system captures a snapshot of the state of the application at the first computing instance. The snapshot may be a baseline snapshot indicative of an initial state of the application or a delta snapshot indicative of changes in the state since a last snapshot (delta or baseline) was captured. When the computer system receives an indication that the first computing instance is to stop servicing the application, the computer system instructs the first computing instance to stop running the process for the application, identifies a second computing instance, and moves data from a most recent snapshot (or snapshots) to the second computing instance.

Capturing Snapshots at Computing Instances

Figure 1:
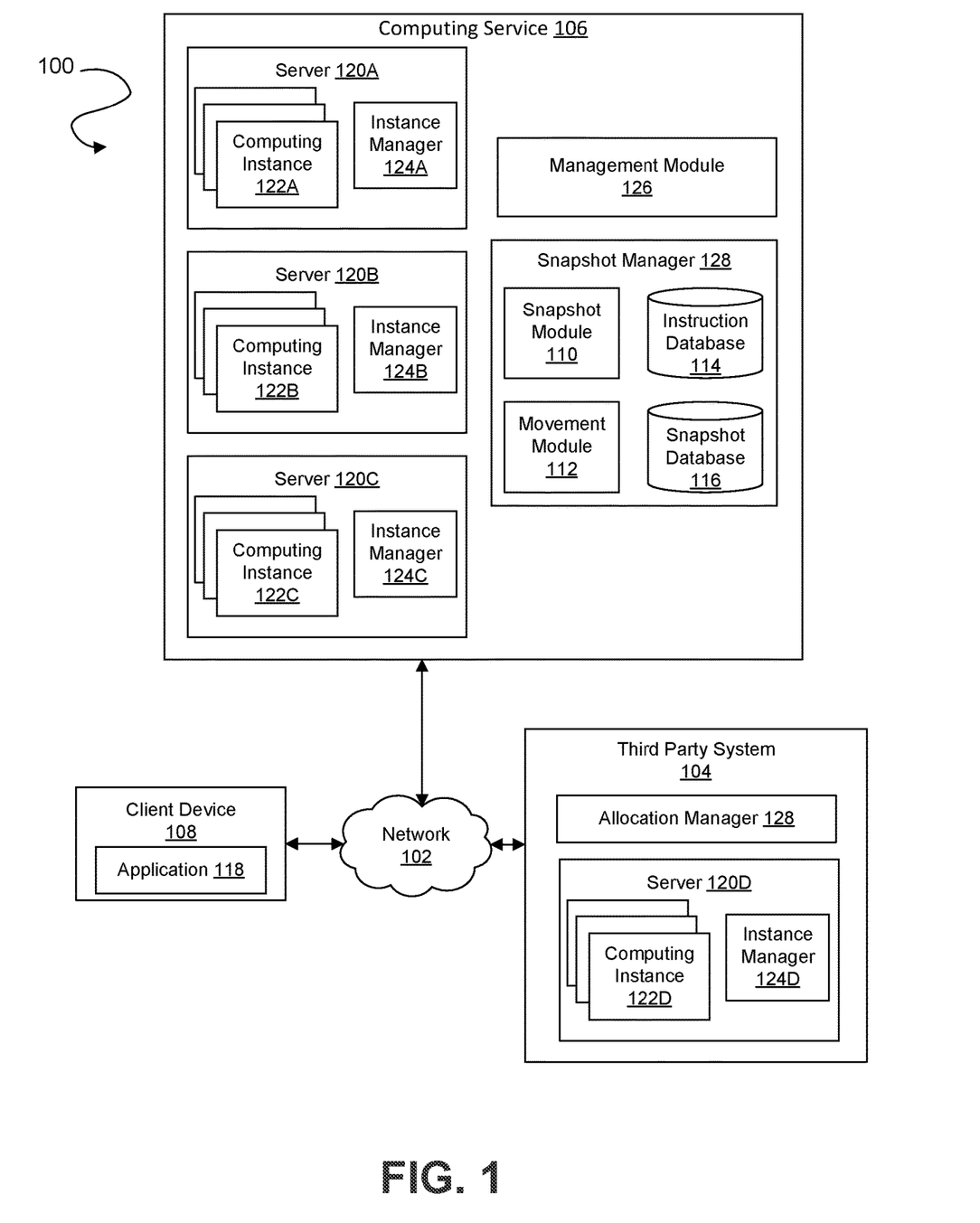
FIG. 1 shows an example block diagram of a cloud environment of a computing service.

FIG. 1 shows an example block diagram of a cloud computing environment 100 of a computing service 106. The computing service 106 can be used to execute and manage a number of computing instances 122A-C and connects to a third party system 104 and a client device 108 via a network 102. In additional or alternative embodiments, the cloud computing environment 100 includes other components or connections between components than shown in FIG. 1. For example, in some embodiments, the computing service 106 connects to multiple third party systems 104 to participate in auctions for computing instances 122. In some embodiments, the cloud computing environment 100 includes a single cloud. In other embodiments, the cloud computing environment 100 is cloud-to-cloud or another type of cloud-based integration.

The network 102 interconnects the components of the computing service 400. The network 102 can be any suitable collection of distinct networks operating wholly or partially in conjunction to provide connectivity to/from the components. The network 102 may be a local area network (LAN) and may be connected to a Wide Area Network (WAN) or the Internet, allowing the client 108 and third party system 104 to access the computing service 106. In one embodiment, network communications can be achieved by an open network, such as the Internet, or a private network, such as an intranet and/or the extranet. For example, the Internet can provide file transfer, remote login, email, news, RSS, and other services through any known or convenient protocol, such as, but not limited to the TCP/IP protocol, Open System Interconnections (OSI), FTP, UPnP, iSCSI, NSF, ISDN, PDH, RS-232, SDH, SONET, etc.

The client device 108 can be used by a client to request setup of a transmission control protocol (TCP) connection with a computing instance 122A for running an application 118. The application 118 is a stateful application in that if the state of the application 118 is saved before the application 118 loses access to a computing instance 122A running the application 118, the application continue to run from the saved state on a new computing instance 1228. The client device 108 may communicate a synchronization packet in order to request setup of the TCP connection and may communicate directly with the computing instance 122A once the TCP connection is complete. The client device 108 may be any device capable of sending and receiving data (e.g., packets) over the network 102 and may comprise a processor-based system such as a computing device. The client device 108 may be a desktop computer, laptop or notebook computer, tablet computer, mainframe computer system, handheld computer, workstation, network computer, or other any other device with like capabilities. Though only one client device 108 is shown in FIG. 1, in some embodiments, the cloud computing environment 100 includes multiple client devices 108 each associated with an application 118.

The third party system 104 is external to the computing service 106 and includes one or more servers 120. One of the servers 120D is configured to execute an allocation a manager 128 that communicates with client devices 108 and the computing service 106 to allocate computing instances 122 based on auctions. Though only one third party system 104 is shown in FIG. 1, any number of third party systems may be connected to the computing service 106 via the network 102 in other embodiments.

The computing service 106 includes a plurality of servers 120A-C. Though three servers 120 are shown in FIG. 1, in some embodiments, any number of servers 120 may be included at the computing service 106. Each server 120 may be a physical host for computing instances 122. The computing service 106 may provide computing resources for executing computing instances 122A-C. The computing instances 122A-C are virtual machines, which are instances of software implementations of a machine (e.g., a computer) that executes applications like a physical machine. Each of the servers 120A-C is configured to execute an instance manager 124A-C that is capable of executing the computing instances 122A-C. The instance manager 124A-C may be a hypervisor, virtual machine monitor (VMM), or another type of program configured to enable the execution of multiple computing instances 122A-C on a single server 120A-C. Additionally, each of the computing instances 122A-C may be configured to execute one or more applications 118.

One or more of the servers 120A-C may be reserved to execute software components or managing operation of the computing service 106 and the computing instances 122A-C. Examples of functions executed by the servers 120A-C include querying the other servers 120A-C for available computing slots and determining placement of computing instances 122A-C in the computing slots. The computing service 106 includes a plurality of components that allow the computing service 106 to save the state of an application 118 running on a computing instance 122 to prevent the state from being lost if the computing instance 1122 is shut down or otherwise recalled from serving the application 118. For example, an application 118 may be running a long job on a first computing instance 122A when the third party system recalls the first computing instance 122A from servicing the application. To prevent the application 118 from having to abandon the work for the job completed at the first computing instance 122A, the computing service 106 executes its components via the servers 120A-C to capture snapshots describing the job running at the first computing instance 122A such that the snapshots can be used to restore the job at another computing instance 122B in the event that the first computing instance 122A stops serving the application 118.

A server 120A-C may also execute a management module 126 that a client can access to configure operation of the computing instances 122A-C purchased by the client. When executed by a server 120A, the management module 126 communicates with the client device 108 to run an application 118 at one or more computing instances 122A-C and sends identifiers of the computing instances 122A-C running the application 118 to the movement module 112 for monitoring. In some embodiments, the management module 126 also receives snapshot instructions from the client device 108 or a device of an external operator and stores the snapshot instructions in the instruction database 114 of the snapshot manager 128. The management module 126 may also determine a replacement computing instance 122A for an application 118 based on a request from the movement module 112. The management module 126 may determine the replacement computing instance 122A for the application 118 based on memory required to run one or more phases of the application, network bandwidth needed by the application 118, CPU needed by the application, and price a client device 108 is willing to pay for the replacement computing instance 122A. This allows the computing service 106 to use computing instances 122A-C that best fit the needs of the application 118 (e.g., more or less memory, additional CPU, increased network bandwidth, lower cost, support via other computing resources, etc.) to optimize for cost spent on computing instances 122A-C.

Other actions performed by the management module 126 include assisting in selecting computing instances 122A-C for a client device 108, deploying computing instances 122A-C, accessing account information of the computing instances 122A-C (e.g., geographic location, owner information, etc.), accessing account information associated with the client device 108 (e.g., name, address, security information for API request, etc.), configuring the computing instances 122A-C, and instructing the snapshot manager 128 to begin capturing snapshots at computing instances 122A-C. For example, in some embodiments, the management module 126 installs an application 118 at one of the computing instances 122 based on a request from the client device 108.

The one or more servers 122A-C of the computing service 106 are configured to execute the snapshot manager 128. The snapshot manager 128 is used to take snapshots of the state of applications or other programs running at the computing instances 122A-C. For example, the snapshot manager 128 may receive notifications from the third party system 104 (or another external system) that a computing instance 122A is allocated to the application 118. The snapshot manager 128 captures snapshots of the state of the application 118 running on a computing instance 122A and monitors the computing instance 122A to determine if the data for the application 118 needs to/can be moved to another computing instance 122B. The snapshot manager 128 moves data from one or more snapshots to a new computing instance 122B in response and captures snapshots of the state of the application 118 at the new computing instance 122B.

The snapshot manager 128 includes a snapshot module 110, a movement module 112, an instruction database 114, and a snapshot database 116. In some embodiments, the snapshot manager 128 includes additional or alternative modules or databases than those shown in FIG. 1. For example, in some embodiments, the snapshot manager 128 includes a module that bids at auctions for computing instances 122 for the client device 108. For simplicity, the following description is described in relation to the application 118 running on a computing instance 122A, but in other embodiments, the snapshot manager 128 captures snapshots for other applications, processes, and software running at the computing instances 122A-C.

The snapshot module 110 captures snapshots of a state of the application 118 running at the computing instance 122A. The snapshot module 110 receives an indication from the management module 126 that the computing instance 122A is running the application 118 for the client device 108. The snapshot module 110 captures a baseline snapshot of the state of the application 118 on the computing instance 122A. The baseline snapshot includes all of the data describing the state of the application 118 at the computing instance 122A and serves as a reference point of the entire state of the application 118 running at the computing instance 122A at the time the baseline snapshot was captured. The snapshot module 110 stores the baseline snapshot in the snapshot database 116 in association with an identifier of the computing instance 122A and a time the baseline snapshot was captured.

The snapshot module 110 determines one or more types of other snapshots to capture of the state of the application 118 at the computing instance 122A. The types of snapshots include baseline snapshots and delta snapshots. A baseline snapshot captures full data of the state of the application 118 at a computing instance 122A. A delta snapshot captures changes in data of the state of the application 118 since a last snapshot (either baseline or delta) was captured. In some embodiments, the snapshot module 110 determines what types of snapshots to take for the application 118 based on snapshot instructions associated with the client device 108. The snapshot instructions may be dictated by a client and stored by the management module 126 in the instruction database 114 for the snapshot module 110 to access. In some embodiments, the snapshot instructions are dictated by an external operator of the computing service 106 and stored in the instruction database 114.

The snapshot instructions describe the types of snapshots to capture for the application 118. In some embodiments, the snapshot instructions further indicate a timing for capturing each type of snapshot. The timing may indicate to capture snapshots repeatedly (e.g., at periodic or variable intervals) or to capture snapshots when one or more actions occur within the cloud computing environment 100. For example, the snapshot instructions may indicate for the snapshot module 110 to capture a baseline snapshot whenever the computing instances 122A finishes running a first process at the computing instance 122A. Based on the snapshot instructions, snapshot module 110 captures snapshots of the state of the application 118 at the computing instance 122A. For example, the snapshot module 110 may capture a baseline snapshot when the application 118 begins running at the computing instance 122A and a delta snapshot every time the application 118 finishes a process. In another example, the snapshot module 110 captures a baseline snapshot once an hour and captures delta snapshots in between each baseline snapshot at 15 minute intervals. The snapshot module 110 stores the snapshots in the snapshot database 116 in association with the identifier of the computing instance 122A and times the snapshots were captured.

The snapshot module 110 receives requests for the movement module 112 for snapshots for the computing instance 122A. Upon receiving a request, the snapshot module 110 accesses the snapshot database 116 to retrieve one or more snapshots associated with the identifier of the computing instances 122A. The snapshot module 110 may further access the instruction database 114 to access the snapshot instructions for the application 118, which the snapshot module 110 uses to determine which snapshots to send to the movement module 112. For example, the snapshot instructions may indicate to send a most recent snapshot (baseline or delta), a most recent baseline snapshot and subsequently captured delta snapshots, a most recent baseline snapshot and a most recent delta snapshot, and the like. The snapshot module 110 sends the determined snapshots to the movement module 112. For example, some embodiments, the snapshot module 110 sends a most recent snapshot to the movement module 108. The most recent snapshot is the snapshot the snapshot module 110 most recently captured for the computing instance 122A and may be of either type (baseline or delta). For example, in some embodiments, the snapshot module 110 sends only the most recently captured baseline snapshot and all delta snapshots captured subsequently to the most recently captured baseline snapshot to the movement module 112.

In some embodiments, when snapshot module 110 receives a request for snapshots for a computing instance 122A from the movement module 112, the snapshot module 110 accesses a most recent snapshot captured for the computing instance 122A. Based on the most recent snapshot, the snapshot module 110 captures a delta snapshot of the state of the application 118 running at the computing instance 122A. In these instances, the snapshot module 122A captures as much of the delta snapshot as possible before the computing instance 122A stops servicing the application 118 or uses a most recent delta snapshot in place of the new delta snapshot. The snapshot module 122A stores the delta snapshot in the snapshot database 116 and sends the delta snapshot and the most recent snapshot to the movement module 112 to respond to the request.

The movement module 112 monitors the computing instance 122A as the computing instance 122A runs the application 118 to determine the computing if data for the application 118 should be moved to another computing instance 122B. In particular, the movement module 112 receives the identifier of the computing instance 122A from the management module 126. The movement module 112 assesses data output from the computing instance 122A for the application 118 to determine if the data for the application 118 should be moved. For example, if the computing instance 122A is not outputting data as expected for the application 122A or has otherwise shut down, the movement module 112 determines that the data needs to be moved. Further, if the computing instance 122A does not have the computing resources (e.g., memory, processing power, etc.) necessary to run an upcoming process or phase of the application 118, the movement module 112 determines that the data needs to be moved. In another example, if the computing instance 122A has more than a threshold amount of a computing resource, such as memory, necessary to run the application 118 (or an upcoming phase of the application 118), the movement module 112 determines that the data can be moved to a computing instance 122B with less of the computing resource available. This allows the movement module 112 to dynamically reallocate the application 118 to a computing instance 122B based on its computing resource needs, which may allow the client to save money on computing resource cost.

In some embodiments, the movement module 112 also monitors for indications from a third party system 104 that provided the client access to the computing instance 122A. The third party system 104 may send an indication that it is recalling the computing instance 122A due to receiving a higher bid at auction for the computing instance 122A, due to needing to use the computing instance 122A, or any other reason the third party system 104 needs to remove access to the computing instance 122A. When the third party system 104 sends an indication that it is recalling the computing instance 122A for use by the client, the movement module 112 receives the indication and determines that the data for the application 118 should be moved to another computing instance 1228.

Upon making the determination that data for the application 118 should be moved from the computing instance 122A, the movement module 112 requests snapshots of the state of the application 118 at the computing instance 122A from the snapshot module 110. In some embodiments, the movement module 112 accesses the snapshots for the application 118 from the snapshot database 116. The movement module 112 receives one or more snapshots from the snapshot module 110 representative of the state of the application 118 at the computing instance 122A. In some embodiments, the movement module 112 receives a most recent snapshot captured at the computing instance 122A. In some embodiments, the movement module 112 receives one or more delta snapshots and a baseline snapshot captured at the computing instance 122A. In further embodiments, the baseline snapshot is a most recent baseline snapshot that was the last baseline snapshot captured by the snapshot module 110 at the computing instance 122A.

The movement module 112 requests a replacement computing instance 122A from the management module 126 to move data from the snapshots to. The movement module 112 receives an identifier of the replacement computing instance 1228 from the management module 126. The movement module 112 instructs the computing instance 122A to stop running processes/phases for the application 118 and moves data from the one or more received snapshots to the replacement computing instance 122B. In other embodiments, the movement module 112 moves the data from the one or more received snapshots to the replacement computing instance 122B without instructing the computing instance 122A to stop running the application 118, for example, when the computing instance 122A has already shut down or will shut down. The movement module 112 resumes execution of the application 118 on the replacement computing instance 1228 based on the data of the one or more received snapshots.

Figure 2:
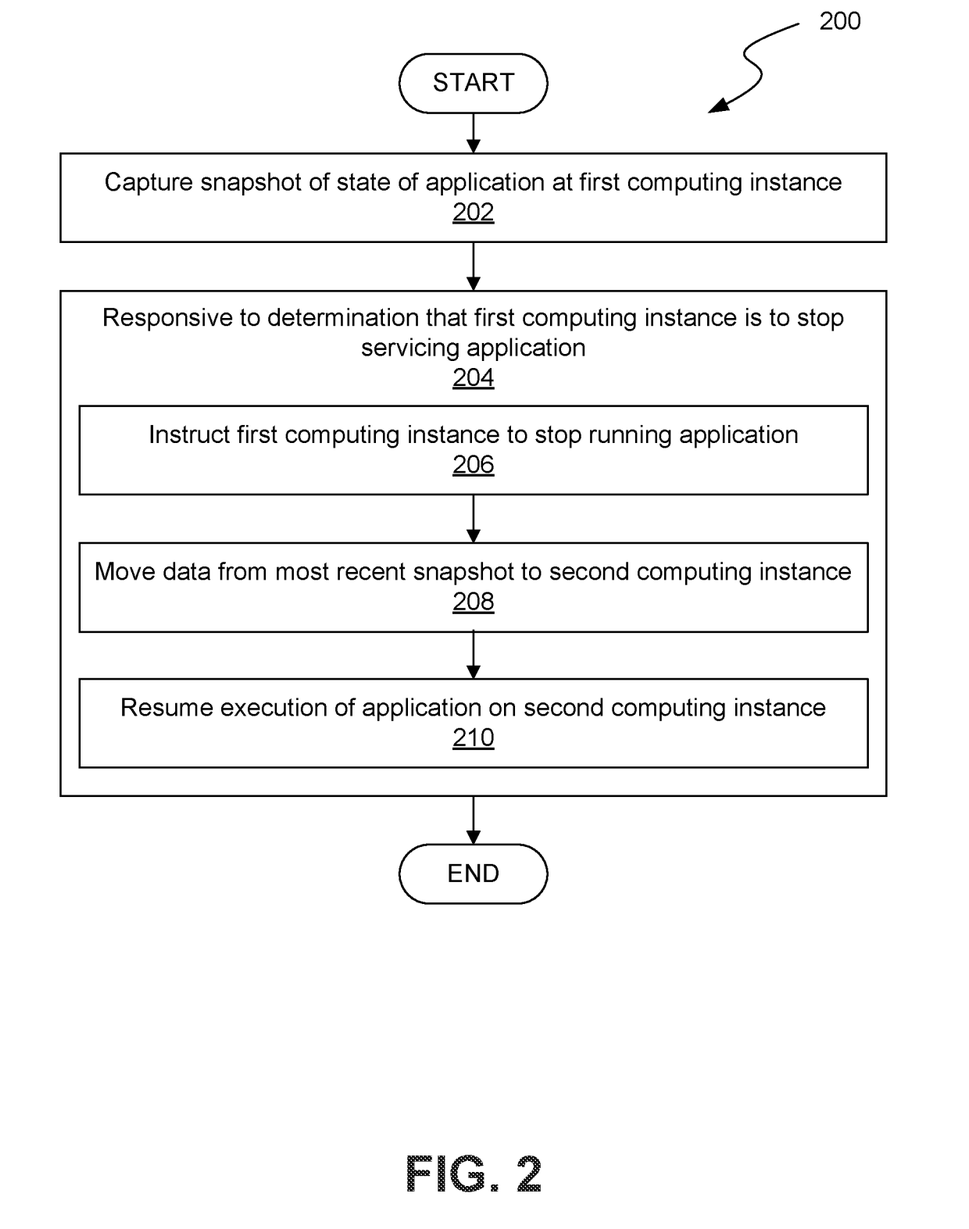
FIG. 2 shows an example process for moving data from a most recent snapshot to a computing instance, according to an embodiment of the introduced technique.

FIG. 2 shows an example process 200 for moving data from a most recent snapshot captured at a first computing instance 112A, according to one embodiment. In this embodiment, the snapshot module 110 captures 202 a snapshot of the state of an application 118 running on the first computing instance 122A. The snapshot module 110 may capture the snapshots variably (e.g., at random or otherwise variable time periods) or periodically over time. The computing instance 122A is a virtual machine or container and is one of a plurality of computing instances 122A-C of the computing service 106. The snapshot module 110 stores the snapshots in the snapshot database 116. The movement module 112 monitors the application 118 running at the first computing instance 122A. In some embodiments, the snapshot module 110 monitors for indications from the third party system 104 that the first computing instance 122A is being recalled from use for the application 118.

In response to determining 204 that the first computing instance 122A is to stop servicing the application 118 (e.g., due to receiving an indication from the third party system, based on output data from the first computing instance 122A, etc.), the movement module 112 requests snapshots for the application 118 at the first computing instance 122A and requests a replacement computing instance 122B from the management module 126. The movement module 112 receives a most recent snapshot (baseline or delta) from the snapshot module 110 and an indication from the management module 126 to execute the application 118 at a second computing instance 122B. In further response to the determination 204, the movement module 112 instructs 206 the first computing instance 122A to stop running the application 118. The movement module 112 moves 208 data from the most recent snapshot to the second computing instance 122B and resumes 210 execution of the application 118 on the second computing instance 1228 based on the data from the most recent snapshot.

In some embodiments, the process 200 includes additional or alternative steps to those shown in FIG. 2. For example, in some embodiments, the snapshot module 112 captures a new snapshot of the state of the application 118 running on the second computing instance 1228 in response to the request for snapshots from the movement module 112. In some embodiments, movement module 112 determines that the application 118 requires more memory than available at the first computing instance 122A and sends the indication requesting the replacement to the management module 126. For example, the movement module 112 may determine an amount of memory that the application 118 requires and, responsive to determining that the memory required is a threshold amount less than memory than available at the first computing instance 122A, the movement module 112 sends the indication requesting the replacement. In some embodiments, the indication specifies for the replacement computing instance 1228 to include less memory than the first computing instance 122A. In another example, responsive to determining that the memory required is more than memory than available at the first computing instance 122A, the movement module 112 sends the indication requesting the replacement. The indication may further specify for the replacement computing instance 122B to include at least the amount of memory required.

Figure 3:
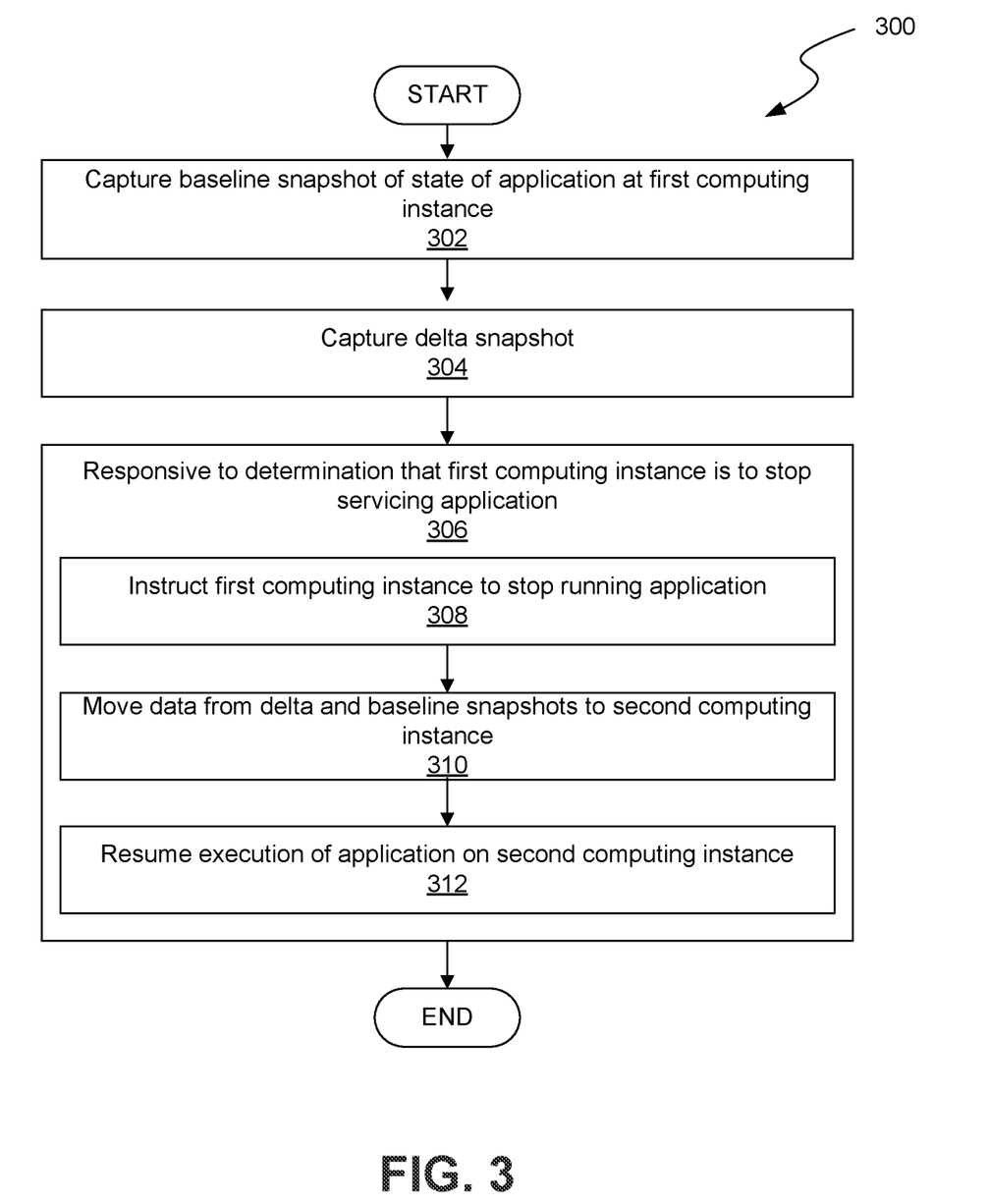
FIG. 3 shows an example process for moving data from delta and baseline snapshots to a computing instance, according to an embodiment of the introduced technique.

FIG. 3 shows an example process 300 for moving data from delta and baseline snapshots from a second computing instance 122B, according to one embodiment. In this embodiment, the snapshot module 110 captures 302 a baseline snapshot of the state of the application 118 running on the second computing instance 122B. The baseline snapshot includes data that describes the entire state of the application 118 at the second computing instance 122B when the baseline snapshot was captured. The snapshot module 110 repeatedly captures 304 a delta snapshot of the state of the application 118 at the second computing instance 122B. In repeatedly capturing the delta snapshot, depending on the embodiment, the snapshot module 110 can capture a new delta snapshot based on the most recent snapshot (either baseline or delta), such that the snapshot module 110 captures a plurality of delta snapshots that together show the changes in the state of the application 118 since the baseline snapshot was captured. The snapshot module 110 may capture the delta snapshots either variably (e.g., at random or otherwise variable time periods) or periodically over time. The snapshot module 110 stores the baseline snapshot and delta snapshots in the snapshot database 116. The movement module 112 monitors the application 118 running at the second computing instance 122B. In some embodiments, the snapshot module 110 monitors for indications from the third party system 104 that the second computing instance 122B is being recalled from use for the application 118.

In response to determining that the second computing instance 122B is to stop servicing the application 118, the movement module 112 requests snapshots of the application 118 at the second computing instance 122B from the snapshot module 110 and requests a replacement computing instance 122C from the management module 126. In further response to the determination 306, the movement module 112 instructs 308 the second computing instance 122B to stop running the application 118. The movement module 112 receives the baseline snapshot and delta snapshots from the snapshot module 110 and an indication of a third computing instance 122C with which to replace the second computing instance 122B from the management module 126. The movement module 112 moves 310 data from the baseline snapshot and the one or more delta snapshots to the third computing instance 122C and resumes 312 execution of the application 118 on the third computing instance 122C based on the data from the snapshots.

In some embodiments, the process 300 includes additional or alternative steps to those shown in FIG. 3. For example, in some embodiments, the snapshot module 110 repeatedly captures the baseline snapshot less frequently than the snapshot module 110 repeatedly captures the delta snapshot. In some embodiments, the snapshot module 110 captures a new delta snapshot of the state of the application 118 running on the third computing instance 122C. The new delta snapshot is based on a new baseline snapshot comprising the baseline snapshot and the delta snapshots captured for the application 118 at the second computing instance 122B. In other embodiments, snapshot module 110 captures a new baseline snapshot of the state of the application 118 running on the third computing instance 122C.

In some embodiments, movement module 112 determines that the application 118 requires more memory than available at the second computing instance 122B and sends the request for the replacement to the management module 126. For example, the movement module 112 may determine an amount of memory that the application 118 requires and, responsive to determining that the memory required by is a threshold amount less than memory than available at the second computing instance 122B, the movement module 112 sends the request for the replacement.

Figure 4:
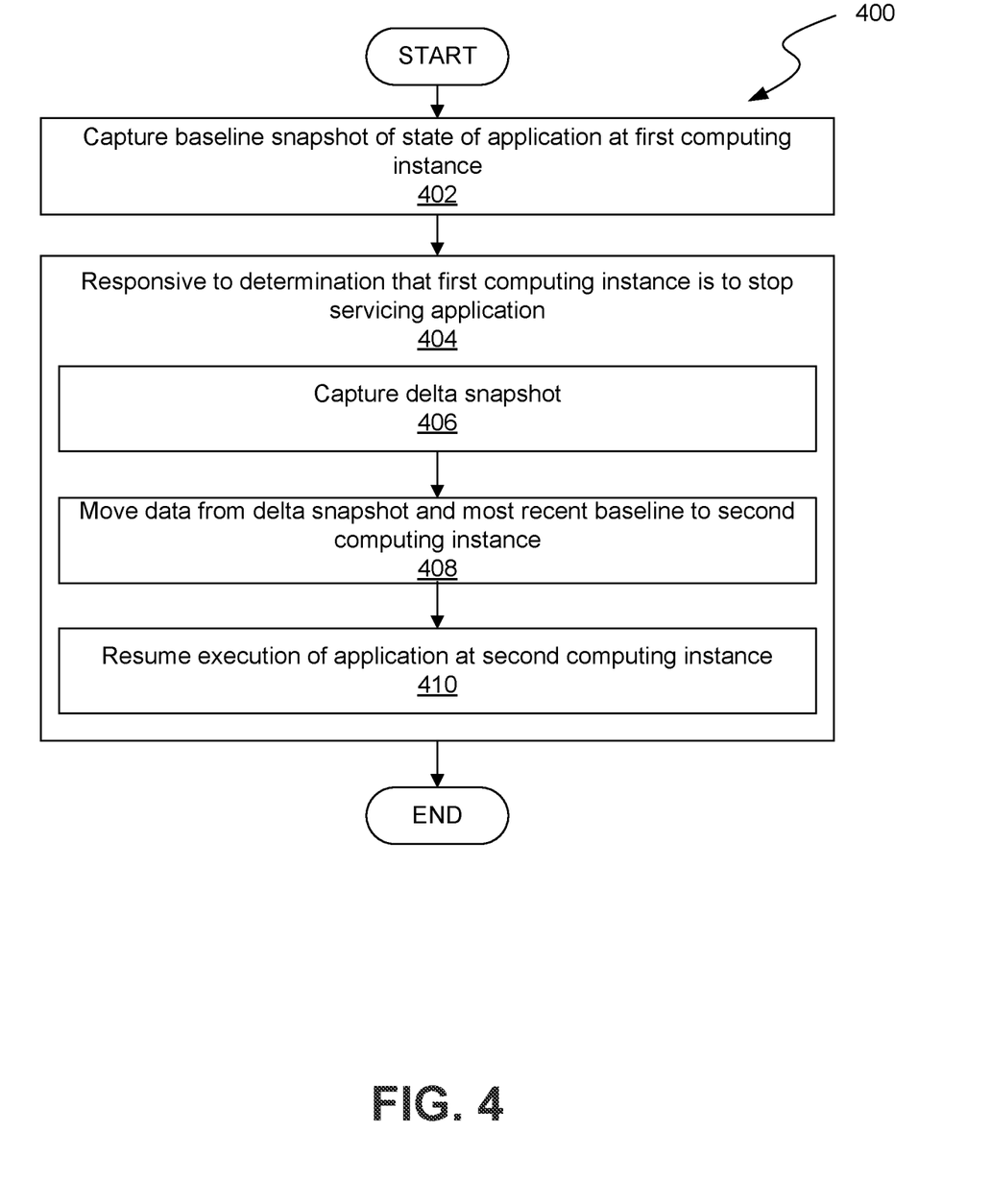
FIG. 4 shows an example process for moving data from a delta snapshot and most recent baseline snapshot to a computing instance, according to an embodiment of the introduced technique.

FIG. 4 shows an example process 400 for moving data from a delta snapshot and most recent baseline snapshot from a third computing instance 122C, according to one embodiment. In this embodiment, the snapshot module 110 repeatedly captures 402 a baseline snapshot of the state of the application 118 running on the third computing instance 122C by capturing the new baseline snapshot at uneven (e.g., variable) rates or even (e.g., periodic) rates. The snapshot module 110 stores the baseline snapshots in the snapshot database 116. The movement module 112 monitors the third computing instance 122C to determine if the third computing instance 122C is to stop servicing the application 118. The movement module 112 also monitors for indications from the third party system 104 indicating that the third party system 104 is recalling the third computing instance 122C from use by the application 118.

In response to determining that the third computing instance 122C is to stop servicing the application 118, the movement module 112 requests a replacement computing instance 122A from the management module 126. In response to the determination 404, the movement module 112 requests snapshots of the application 118 running at the third computing instance 122C from the snapshot module 110 and the snapshot module 110 accesses a most recent snapshot captured for the third computing instance 122C from the snapshot database 116. The snapshot module 110 captures 406 a delta snapshot of the state of the application 118 based on the most recent baseline snapshot. The delta snapshot includes data describing change in the state of the application 118 since the most recent baseline snapshot was taken. The snapshot module 110 stores the delta snapshot in the snapshot database 116 and sends the most recent snapshot and delta snapshot to the movement module 112.

The movement module 112 instructs the third computing instance 122C to stop running the application 118. The movement module 112 receives an indication of a fourth computing instance 122A with which to replace the third computing instance 122C for the application 118. The movement module 112 moves 408 data from the most recent baseline snapshot and the delta snapshot to the fourth computing instance 122A and resumes 410 execution of the application 118 on the fourth computing instance 122A based on the data. In some embodiments, the snapshot module 110 repeatedly captures a baseline snapshot of the state of the application 118 running on the fourth computing instance 122A.

In some embodiments, the process 400 includes additional or alternative steps to those shown in FIG. 4. For example, in some embodiments, responsive to the third computing instance 122C shutting down before the snapshot module 110 has finished capturing the delta snapshot, the movement module 112 moves data from the most recent baseline snapshot and a most recent delta snapshot captured before the delta snapshot to the fourth computing instance 122A. In some embodiments, the delta snapshot includes data describing change in the state of the application 118 since the most recent delta snapshot was taken. In these instances, the snapshot module 110 sends the delta snapshot, the most recent delta snapshot, previous delta snapshots captured after the most recent baseline snapshot, and the most recent baseline snapshot to the movement module 112.

In some embodiments, the movement module 112 moves unshadowed data (e.g., data not shadowed by a subsequent copy-on-write operation) from the most recent baseline snapshot, the most recent delta snapshot, and all delta snapshots captured until the most recent delta snapshot.

The systems and methods for capturing snapshots described above may be used to reduce computing costs and time to complete workloads for applications compared to running applications using application-specific checkpoint (e.g., snapshot) mechanisms. For example, when a workload for an application is launched on a first computing instance, a checkpoint coordinator may be launched simultaneously. The checkpoint coordinator may be Spot-on, which is a generic software framework and is responsible for capturing snapshots (delta or baseline) and restoring the application on other computing instances. The checkpoint coordinator may be associated with a transparent checkpointing package and may share snapshots between computing instances using a network file system (NFS) service (e.g., Azure's NFS service). The checkpoint coordinator schedules repeated snapshotting (e.g., as done with the snapshot module 110) and monitors eviction events using APIs provided by a cloud to determine if the application is going to be evicted from (e.g., can no longer run on) the first computing instance. The checkpoint coordinator uses Azure's representational state transfer (REST) API to access an Azure metadata service that gives the checkpoint coordinator time to prepare for events (e.g., computing instance reclamations/evictions). When a GET call is run to a specified endpoint, a JSON object is returned listing the number of events and event types scheduled for the first computing instance. Information is available via a non-routable IP so that it is not exposed outside the system. An eviction notification is of type "Preempt" and gives the checkpoint coordinator a minimum of 30 seconds to prepare for the eviction.

When the checkpoint coordinator detects an eviction of the application from the first computing instance, the checkpoint coordinator makes a termination snapshot, in addition to the repeatedly taken snapshots. The termination snapshot may be a delta snapshot based on previous delta snapshots and/or a previous baseline snapshot. The termination snapshot is opportunistic in that it may possibly fail if the time period between the eviction notice and eviction is short (e.g., seconds/minutes). This supports both application-specific and transparent checkpointing (e.g., snapshotting).

After eviction from the first computing instance, a second computing instance is created automatically or manually through a scheduling system of a cloud vendor or a resource scheduler. The checkpoint coordinator automatically searches for a most recent valid snapshot and resumes the workload for the application on the second computing instance based on the most valid snapshot. The checkpoint coordinator transfers or shares the snapshots from the first computing instance to the second computing instance through cloud storage services (e.g., elastic block stores, network or distributed file systems, object, and blob stores.

In some embodiments, the processes of FIGS. 2-4 may be combined. For instance, the snapshot module 110 repeatedly captures 402 a baseline snapshot of the state of the application 118 running on a first computing instance 122A by capturing the baseline snapshot at uneven (e.g., variable) rates or even (e.g., periodic) rates. Between the baseline snapshots, the snapshot module 110 repeatedly captures delta snapshots describing change in state of the application since a most recent snapshot (either baseline or delta) was captured. The snapshot module 110 may do so by capturing the delta snapshots at uneven (e.g., variable) rates or even (e.g., periodic) rates. The snapshot module 110 stores the baseline snapshots and delta snapshots in the snapshot database 116. The movement module 112 monitors the first computing instance 122A to determine if the first computing instance 122A is to stop servicing the application 118. The movement module 112 also monitors for indications from the third party system 104 indicating that the third party system 104 is recalling the first computing instance 122A from use by the application 118.

In response to determining that the first computing instance 122A is to stop servicing the application 118, the movement module 112 requests a replacement computing instance 122B from the management module 126. In response to the determination 404, the movement module 112 requests snapshots of the application 118 running at the first computing instance 122A from the snapshot module 110, and the snapshot module 110 accesses a most recent baseline snapshot and related delta snapshots captured for the first computing instance 122A from the snapshot database 116. The snapshot module 110 captures 406 a new delta snapshot of the state of the application 118 based on the most recent baseline snapshot and/or related delta snapshots. The new delta snapshot includes data describing change in the state of the application 118 since a most recent snapshot (delta or baseline) taken. The snapshot module 110 stores the new delta snapshot in the snapshot database 116 and sends the most recent baseline snapshot, related delta snapshots, and delta snapshot to the movement module 112.

The movement module 112 instructs the first computing instance 122A to stop running the application 118. The movement module 112 receives an indication of a second computing instance 122B with which to replace the first computing instance 122A for the application 118. The movement module 112 moves 408 data from the most recent baseline snapshot, the related delta snapshots, and the new delta snapshot to the second computing instance 122B and resumes 410 execution of the application 118 on the second computing instance 122B based on the data. In some embodiments, the snapshot module 110 repeatedly captures baseline and delta snapshots snapshot of the state of the application 118 running on the second computing instance 122B.

Computer Processing System

Figure 5:
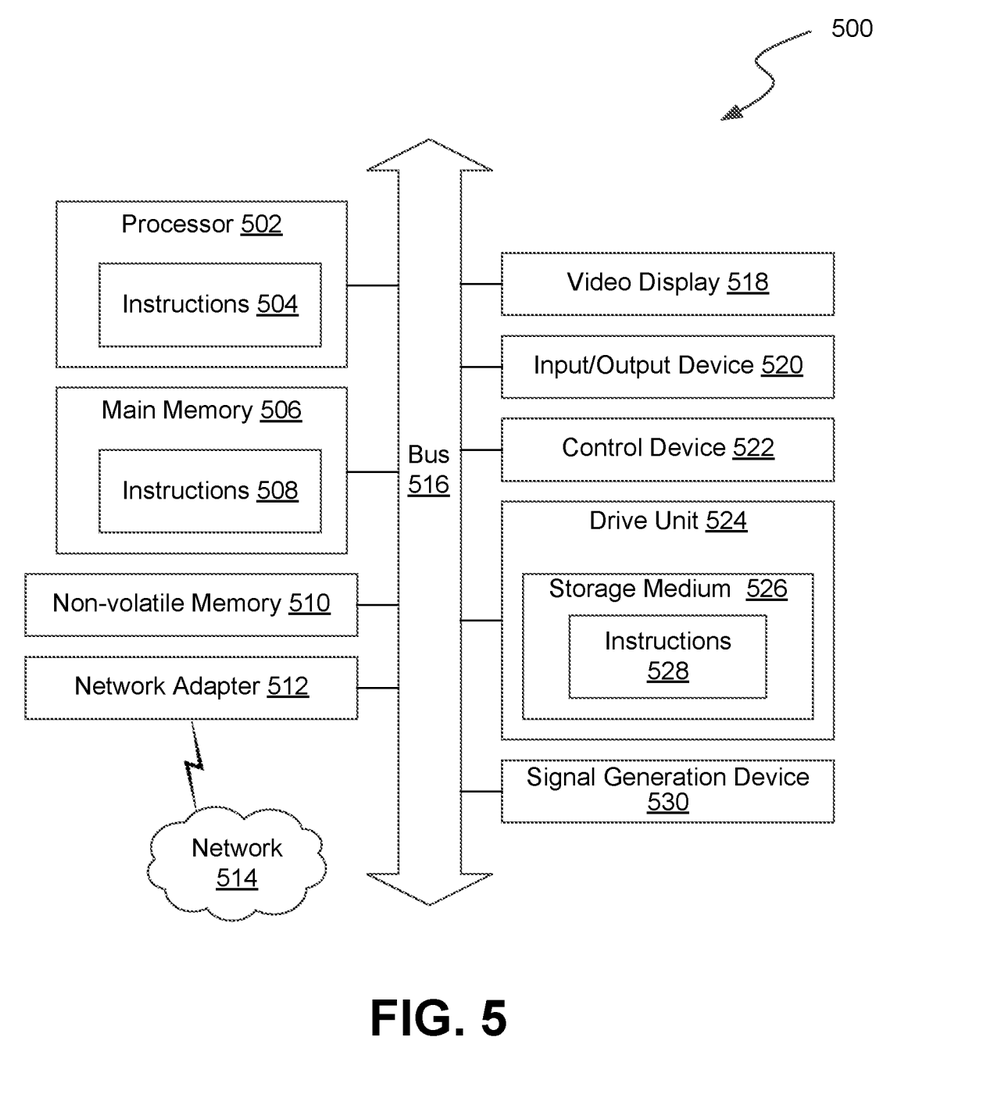
FIG. 5 shows a block diagram illustrating an example of a processing system in which at least some operations described herein can be implemented.

FIG. 5 is a block diagram illustrating an example of a computer processing system 500 in which at least some operations, e.g., processes 200, 300, and 400 (described with respect to FIGS. 2-4) described herein can be implemented. For example, the computer processing system 500 can be used to implement various embodiments of computer systems described herein, such as one or more portions of the computing service 106, the servers 120, the client device 108, and/or the third party system 104 (described with respect to FIG. 1). Also, depending on the implementation, some components of the computer processing system 500 may be part of a computer system executing an application (e.g., application 118).

The processing system 500 may include one or more central processing units ("processors") 502, main memory 506, non-volatile memory 510, network adapter 512 (e.g., network interface), video display 518, input/output devices 520, control device 522 (e.g., keyboard and pointing devices), drive unit 524 including a storage medium 526, and signal generation device 530 that are communicatively connected to a bus 516. The bus 516 is illustrated as an abstraction that represents one or more physical buses and/or point-to-point connections that are connected by appropriate bridges, adapters, or controllers. The bus 516, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 500 may share a similar computer processor architecture as that of a server computer, a desktop computer, a tablet computer, personal digital assistant (PDA), mobile phone, a wearable electronic device (e.g., a watch or fitness tracker), network-connected ("smart") device (e.g., a television or home assistant device), virtual/augmented reality systems (e.g., a head-mounted display), or any other electronic device capable of executing a set of instructions (sequential or otherwise) that specify action(s) to be taken by the processing system 500.

While the main memory 506, non-volatile memory 510, and storage medium 526 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 528. The term "machine-readable medium" and "storage medium" shall also be taken to include any medium that is capable of storing, encoding, or carrying a set of instructions for execution by the processing system 500.

In some cases, the routines executed to implement certain embodiments of the disclosure may be implemented as part of an operating system or a specific application, component, program, object, module, or sequence of instructions (collectively referred to as "computer programs"). The computer programs typically comprise one or more instructions (e.g., instructions for the computing service 106) set at various times in various memory and storage devices in a computing device. When read and executed by the one or more processor 502, the instruction(s) cause the processing system 500 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and on-volatile memory devices 510, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 512 enables the processing system 500 to mediate data in a network 514 with an entity that is external to the processing system 500 through any communication protocol supported by the processing system 500 and the external entity. The network adapter 512 can include a network adaptor card, a wireless network interface card, a router, an access point, a wireless router, a switch, a multi-layer switch, a protocol converter, a gateway, a bridge, a bridge router, a hub, a digital media receiver, and/or a repeater.

The network adapter 512 may include a firewall that governs and/or manages permission to access/proxy data in a computer network, as well as tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method for saving a state of an application in a cloud environment, the method comprising:
repeatedly capturing, by a computer system associated with the cloud environment, a baseline snapshot of the state of the application running on a first computing instance, wherein the first computing instance is a virtual machine or container and is one of a plurality of computing instances in a memory pool connected to the computer system, and wherein the application is a third party application separate from the computer system;

repeatedly capturing, by the computer system, a delta snapshot of the state of the application running on the first computing instance, wherein each delta snapshot comprises data describing change in the state of the application since a most recent snapshot was captured; and responsive to an indication that the first computing instance is to stop servicing the application:
capturing, by the computing system, a new delta snapshot; and
instructing, by the computer system, the first computing instance to stop running the application;
moving, by the computer system, data from the new delta snapshot, a most recent baseline snapshot, and delta snapshots based on the most recent baseline snapshot to a second computing instance; and
resuming execution of the application on the second computing instance based on the data.

2. The method of claim 1, further comprising:
capturing, by the computer system, a new snapshot of the state of the application running on the second computing instance.

3. The method of claim 1, wherein the indication further indicates that the first computing instance is shutting down.

4. The method of claim 1, wherein the indication is responsive to:
determining, by the computer system, that the application requires more memory than available at the first computing instance.

5. The method of claim 1, wherein the indication is responsive to:
determining, by the computer system, an amount of memory that the application requires; and
determining, by the computer system, that the memory required by the application is a threshold amount less than memory than available at the first computing instance.

6. The method of claim 1, further comprising:
allocating, by the computer system, the second computing instance based on memory required to run the application.

7. The method of claim 1, further comprising:
selecting, by the computer system, the second computing instance from the plurality of computing instances, the selection based on availability of the second computing instance; and
allocating, by the computer system, the second computing instance to run the application.

8. The method of claim 1, further comprising:
allocating, by the computer system, the second computing instance based on an auction price of the second computing instance.

9. A non-transitory computer-readable storage medium storing instructions for causing a processor to perform the method of:
repeatedly capturing, by a computer system associated with the cloud environment, a baseline snapshot of the state of the application running on a first computing instance, wherein the first computing instance is a virtual machine or container and is one of a plurality of computing instances in a memory pool connected to the computer system, and wherein the application is a third party application separate from the computer system;

repeatedly capturing, by the computer system, a delta snapshot of the state of the application running on the first computing instance, wherein each delta snapshot comprises data describing change in the state of the application since a most recent snapshot was captured; and responsive to an indication that the first computing instance is to stop servicing the application:
capturing, by the computing system, a new delta snapshot; and
instructing, by the computer system, the first computing instance to stop running the application;
moving, by the computer system, data from the new delta snapshot, a most recent baseline snapshot, and delta snapshots based on the most recent baseline snapshot to a second computing instance; and
resuming execution of the application on the second computing instance based on the data.

10. The non-transitory computer-readable storage medium of claim 9, the method further comprising:
capturing, by the computer system, a new snapshot of the state of the application running on the second computing instance.

11. The non-transitory computer-readable storage medium of claim 9, wherein the indication further indicates that the first computing instance is shutting down.

12. The non-transitory computer-readable storage medium of claim 9, wherein the indication is responsive to:
determining, by the computer system, that the application requires more memory than available at the first computing instance.

13. The non-transitory computer-readable storage medium of claim 9, wherein the indication is responsive to:
determining, by the computer system, an amount of memory that the application requires; and
determining, by the computer system, that the memory required by the application is a threshold amount less than memory than available at the first computing instance.

14. The non-transitory computer-readable storage medium of claim 9, the method further comprising:
allocating, by the computer system, the second computing instance based on memory required to run the application.

15. The non-transitory computer-readable storage medium of claim 9, the method further comprising:
selecting, by the computer system, the second computing instance from the plurality of computing instances, the selection based on availability of the second computing instance; and
allocating, by the computer system, the second computing instance to run the application.

16. The non-transitory computer-readable storage medium of claim 9, the method further comprising:
allocating, by the computer system, the second computing instance based on an auction price of the second computing instance.

17. A computer system associated with a cloud environment comprising:
a processor; and a non-transitory computer-readable storage medium comprising stored instructions that when executed cause the processor to perform actions comprising:
  repeatedly capturing, by a computer system associated with the cloud environment, a baseline snapshot of the state of the application running on a first computing instance,
    wherein the first computing instance is a virtual machine or container and is one of a plurality of computing instances in a memory pool connected to the computer system, and
    wherein the application is a third party application separate from the computer system;
  repeatedly capturing, by the computer system, a delta snapshot of the state of the application running on the first computing instance, wherein each delta snapshot comprises data describing change in the state of the application since a most recent snapshot was captured; and
  responsive to an indication that the first computing instance is to stop servicing the application:
    capturing, by the computing system, a new delta snapshot; and
    instructing, by the computer system, the first computing instance to stop running the application;
  moving, by the computer system, data from the new delta snapshot, a most recent baseline snapshot, and delta snapshots based on the most recent baseline snapshot to a second computing instance; and
  resuming execution of the application on the second computing instance based on the data.

18. The computer system of claim 17, the actions further comprising:
  capturing, by the computer system, a new snapshot of the state of the application running on the second computing instance.

* * * * *